(12) United States Patent
Hertzberg et al.

(10) Patent No.: US 7,502,897 B2
(45) Date of Patent: Mar. 10, 2009

(54) OBJECT BASED CONFLICT DETECTION IN A SOFTWARE TRANSACTIONAL MEMORY

(75) Inventors: Ben Hertzberg, Santa Cruz, CA (US); Bratin Saha, San Jose, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 11/477,339

(22) Filed: Jun. 28, 2006

(65) Prior Publication Data

US 2008/0022054 A1 Jan. 24, 2008

(51) Int. Cl.
*G06F 12/14* (2006.01)
(52) U.S. Cl. .................................... 711/152
(58) Field of Classification Search ............. None
See application file for complete search history.

(56) References Cited

U.S. PATENT DOCUMENTS 6,850,938 B1 * 2/2005 Sadjadi ..................... 707/8

OTHER PUBLICATIONS

Microsoft Computer Dictionary, 5th Edition; Microsoft Press; 2002; ISBN 0-7356-1495-4; p. 465.*

* cited by examiner

*Primary Examiner*—Reginald G Bragdon
*Assistant Examiner*—Eric Loonan
(74) *Attorney, Agent, or Firm*—Blakely, Sokoloff, Taylor & Zafman LLP

(57) ABSTRACT

Object-based conflict detection is described in the context of software transactional memory. In one example, a block of instructions is received for execution as an object in a software transactional memory transaction. The base of the object is computed, a lock is found for the object using the base of the object.

20 Claims, 3 Drawing Sheets

OBJECT BASED CONFLICT DETECTION IN A SOFTWARE TRANSACTIONAL MEMORY

FIELD

The present description relates to detecting conflicts in multi-threaded and multi-core system architectures and, in particular, to object based conflict detection in the context of software transactional memory.

BACKGROUND

Newer processors for a variety of applications are available with multiple thread capability with a single core and with multiple processing cores. Each thread or core is able to operate on one set of instructions while another thread or core independently operates on a different set of instructions. Currently, multiple threaded and dual core processors are readily available and may be deployed in multiple processor architectures, so that, for example two dual core processors present four independent processing cores. Future processors may have four or more cores in one chip. In order to take full advantage of each core, there must be some way to determine which tasks will be performed by each processor. In one model, the tasks to be performed by the computer are divided into threads, each core will execute all of a single thread, and then move on to another thread. Multiple threading, single or multiple core processors operate similarly executing threads in turn.

As multi-core architectures become more common, multi-threaded programming may become part of mainstream applications. STMs (software transactional memory) are under consideration for easing multi-threaded programming. Emerging HPCS (High Productivity Computing Initiative) languages, such as Fortress, Chapel, and X10, rely solely on transactions for synchronization. These languages rely on a STM for implementing the transaction construct; and the transaction construct in these languages has sophisticated semantics. This makes the STM very important.

Software transactional memory (STM) is a concurrency control mechanism for controlling access to shared memory in multi-threaded computing. A transaction is referred to as an object and represents a series of instructions that executes a series of reads and writes to memory that is shared by the multiple threads. These reads and writes logically occur at a single instant in time in that intermediate states are not visible to other transactions. The object-based structure of STM allows for familiar object-based programming constructs to be used.

Transactions may also be supported in some fashion by special hardware added to a multi-core design. Limited hardware support for transactions is available in some current products. However, a STM may still be required to execute transactional code that cannot be handled in the hardware. As a result, the hardware TM (transaction manager) system is virtualized and an application does not have to bother about size limitations, etc. This also relies on a high-performance STM.

To resolve conflicts in a STM, a cache line-based conflict detection, or some form of hashing scheme is currently used to detect conflicts between transactions. This creates false conflicts between transactions and is less intuitive for the programmer, since the programmer is programming in terms of objects. At the other extreme, word-based conflict detection without aliasing represents too much overhead for an STM, although such schemes have been proposed for HTM (hardware transactional memory). Cache-line or hashing based schemes do not allow the compiler to perform CSE (Common Sub-Expression Elimination) and other redundancy removal in STM code, causing a significant limitation in speed.

BRIEF DESCRIPTION OF THE FIGURES

The invention may be more fully appreciated in connection with the following detailed description taken in conjunction with the accompanying drawings, in which like reference numerals refer to corresponding parts throughout the several views of the drawings, and in which.

DETAILED DESCRIPTION

Figure 1:
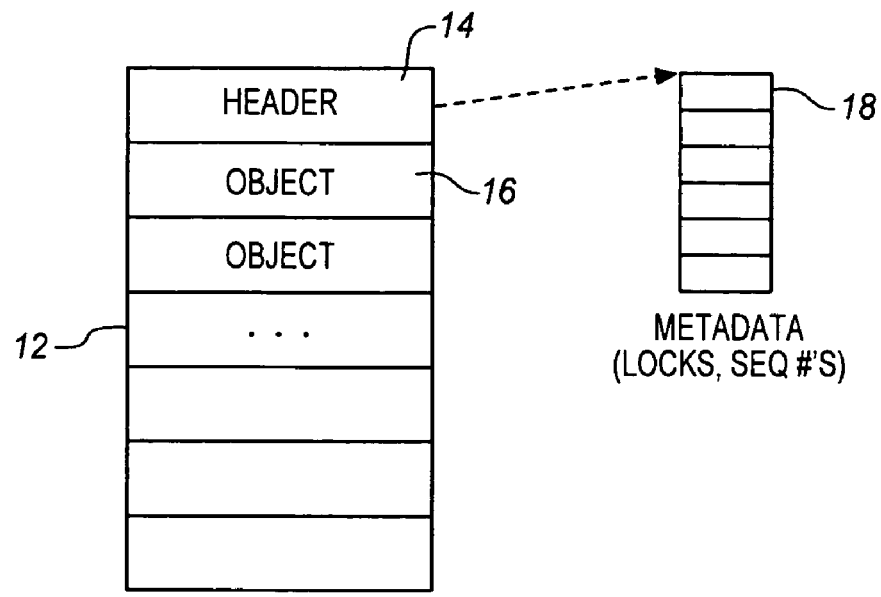
FIG. 1 is a block diagram of a group of locks allocated separately for each block and accessed via a pointer in the block header according to an embodiment of the invention.

Object based conflict detection may be performed in C/C++ and similar languages without explicit management of the locks by the user. Instead memory management automatically provides these locks. Object-level conflict detection represents a balance between cache line-based detection and word-based detection. As a result, compiler optimizations may be leveraged in a STM. Object based locking allows the compiler to perform CSE and other redundancy removal in STM code, which cache-line or hashing-based schemes do not. These optimizations are capable of yielding a significant speedup.

In the present description, unlike hashing, each object has its own lock, so there is no risk of aliasing in a global table. This may be particularly important with large transactions that modify enough data to make hash conflicts probable. If there is even a single false conflict, it can cause an entire transaction to be aborted. Object-based locking may also be able to guarantee access to an entire object with only a single lock. Due to limitations imposed by object alignment and interior pointers in, for example, C++, hash-based locking will typically require the acquisition of one lock for every field modified. The use of object-based locking can substantially reduce these locking overheads in such situations.

The described mechanism for object based conflict detection is particularly suitable for C/C++, and other non-typesafe languages in a software transactional memory implementation. The mechanism may be part of a software transactional memory library which would be used in a threading runtime for C/C++ and similar languages. It may also be part of compilation routines. The mechanism improves the performance of transactional code. It also prevents false conflicts, which may be a difficult performance problem for developers to debug and work around. This may help in the adoption of a transactional programming model among developers and in making ISA (Instruction Set Architecture) extensions practical as well.

Detecting Small Objects

A portion of an application's virtual address space may be reserved by a memory manager for the allocation of small objects. The location of the reserved space may be indicated by an interior pointer. Whenever the STM is asked to lock at a certain address and the pointer is within this reserved area, object-based locking may be used. A check of whether to use object-based locking may be performed quickly and simply with an unsigned comparison. The following is a pseudo code expression for such a test.

interior_pointer–
        reserved_base_address<reserved_area_size

The reserved area size (reserved_area_size) refers to the portion of the application's virtual address space that is reserved. The reserved base address (reserved_base_address) corresponds to the initial address into the table of locks where lock for the memory block is stored.

Hashing for Objects without Object Locks

If the object is not in this "small objects area", it may either be too large for object-based locking, or may be a global/stack variable. For these objects, global hashing may be used. Global hashing may prevent object-based locking from assuming an excessively coarse granularity for locking, which may inhibit parallelism.

Determining Object Metadata Locations from an Interior Pointer

A pointer may point to a variety of different positions. A pointer may be at the edge of an allocated object or in the interior to an allocated object (for example, in the case of nested structures). Therefore, a mechanism may be used to find the base address of the object, given a pointer to a particular offset into it. An alignment mechanism, such as a C run-time mechanism may be leveraged for this. For such an alignment mechanism, each block of memory used by the allocator may be aligned to some large size, for example 16 KB, and contain a header at the start of the block. The memory allocator may use size-segregated allocation pools. For each pool, all objects within a given block may be allocated at the same size. For such a configuration, the following mapping may be performed to determine the object's base given the interior pointer:

header_addr=interior_pointer &~(block_size–1)

index=(interior_pointer–header_size–header_addr)/
        object_size

The header address (header_addr) defines the address of the header in the memory block. The interior pointer (interior_pointer) is mentioned above and the block size (block_size) and header size (header_size) are fixed system parameters established when the system is configured. The object size (object_size) is a field in the header. Once the header address is known, this can be accessed for determining the index (index) or base address. The index is an index into the table of locks that can be used to access the particular lock for the memory block corresponding to the particular object. The table may be populated by the STM when the system is originally established or configured. In normal operations, the table is populated for each object when that object is accessed.

On-Side Object Locks

For on-side object locks, locks are not stored inline with the objects. Instead, a group of locks are allocated separately for each block and accessed via a pointer in the block header. As a result, the object locks do not need to be allocated if the memory is not being used transactionally. This is shown FIG. 1. A block 12 has a header 14 and a sequence of objects 16. The header is applied as an index to a table 18 to determine the lock. The table contains locks and sequence numbers linked to the metadata for the block. The table may be in the block or it may be in a separate location allocated for that purpose.

Inline Object Locks

Figure 2:
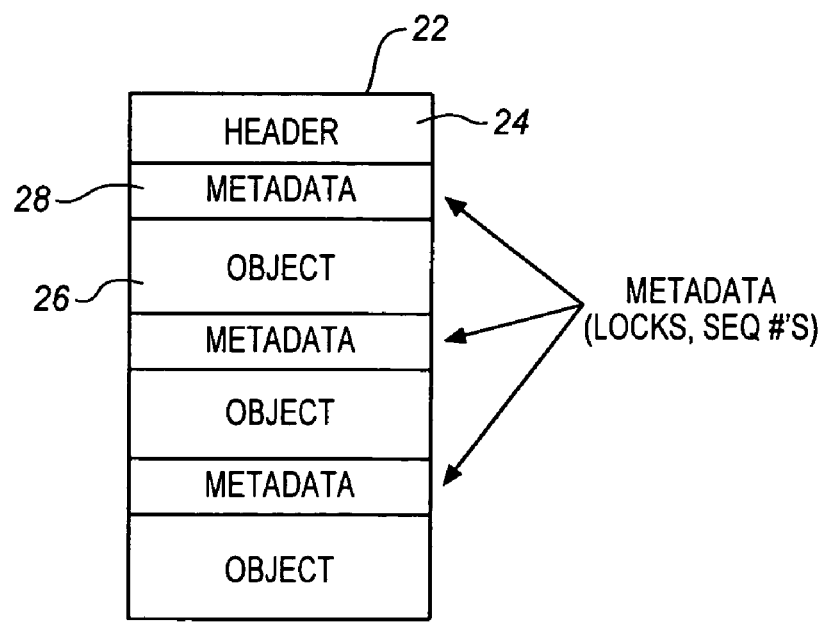
FIG. 2 is a block diagram of a locks held in extra memory co-located with each block according to an embodiment of the invention.

For inline object locks, each allocated object may have extra memory reserved immediately prior to the object's memory. This extra memory may be used to hold the object lock for the object. Accordingly, the object locks are co-located with the data, resulting in a desirable prefetch of the data when accessing the lock. This is shown in FIG. 2. A block 22 contains a header 24 and a sequence of objects 26. The block also contains metadata 28 for each object with locks and sequence numbers.

Operation

Figure 3:
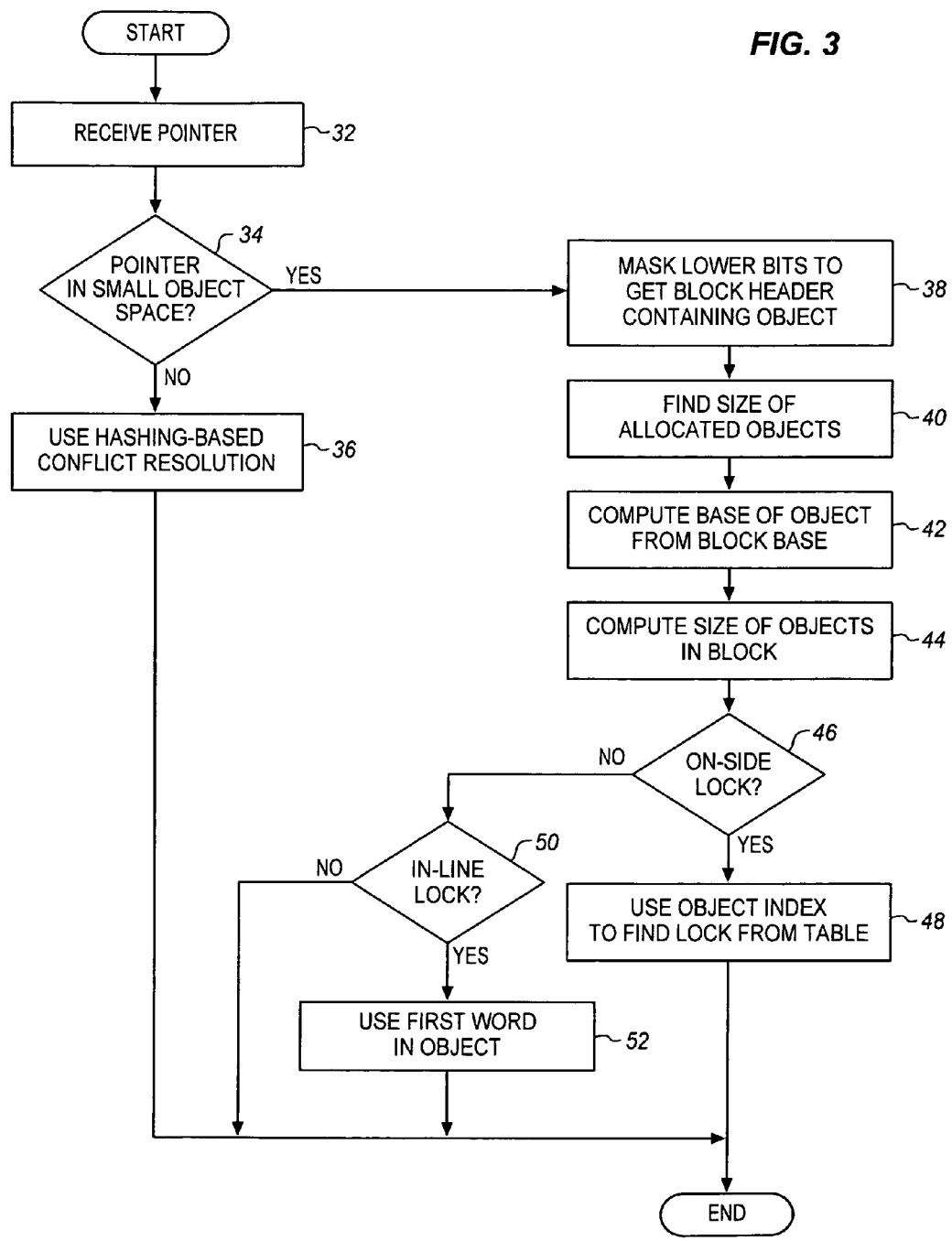
FIG. 3 is a process flow diagram of detecting conflicts using locks according to an embodiment of the invention.

FIG. 3 shows a process that may be performed to detect conflicts. At block 32, a pointer (e.g. interior_pointer) for a block is received. If the pointer is not in small object space as determined at block 34, then hashing-based conflict resolution may be applied at block 36. This ends the conflict detection.

If the pointer is in small object space, then at block 38, the lower bits are masked in order to obtain the block header for the block. At block 40, the size of the objects allocated within the block is determined and at block 42, the base of the object is computed. This may be done using, for example, the base of the block and the size of the objects in the block. At block 44, the size of the object may be determined using, for example, the block header.

Using the base of the object or an index for the base of the object, a lock corresponding to the object may be determined. At block 46, it is determined whether the lock is an on-side lock. For on-side locks, at block 48, the object index is used to find the lock from a lookup table, such as a table of locks for the object's allocation block (FIG. 1). At block 50, it is determined whether the lock is an in-line lock. For inline locks, at block 52, the first word in the object may be used as the lock. This corresponds to the metadata of FIG. 2. Accordingly, the table of locks established, for example in STM, may by found and accessed quickly.

The process flow diagram of FIG. 3 may also be expressed as pseudo-code as follows:
1. Given a pointer, determine whether it is in the small object space.
   a. If not, then use hashing based conflict resolution.
2. Mask the lower bits to get the address for the block header containing the object.
3. Find the size of the objects allocated in this block.
4. Compute the base of the object from the base of the block, and the size of the objects in the block.
5. Given the base of the object (or its index), the lock corresponding to the object is found in the following way:
   a. For on-side locks, use the object index to find the lock from the table of locks for the object.
   b. For inline locks, the lock is the first word in the object.

Figure 4:
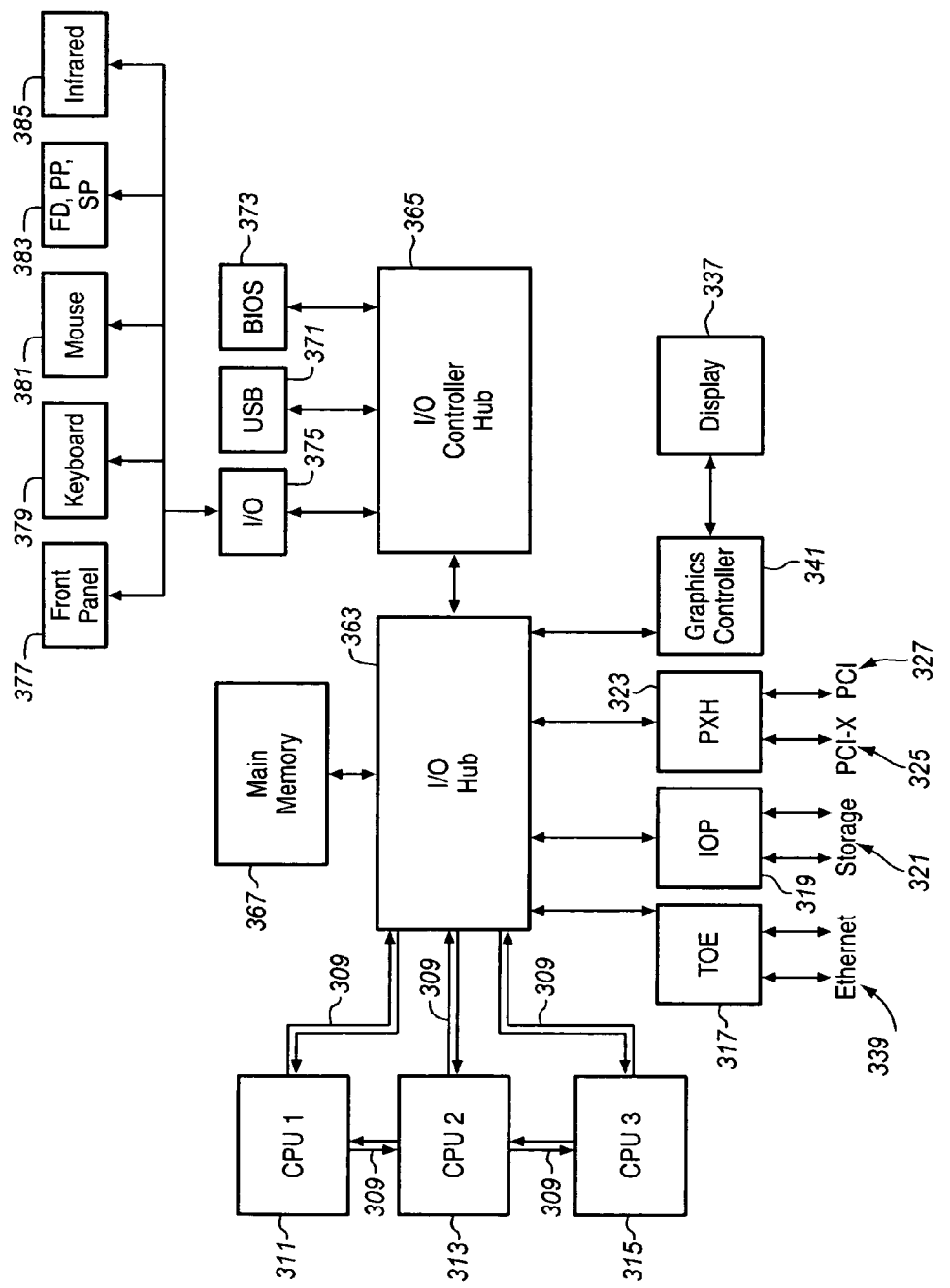
FIG. 4 is a block diagram of a computer system suitable for implementing embodiments of the present invention.

FIG. 4 shows an example of a computer system suitable for implementing the present invention, both in a run-time environment as a compiler. An IOH (Input/Output Hub), north bridge, or host controller 363 interfaces one or more CPUs (central processing unit) with memory and I/O devices and may provide a wide range of other features such as increased performance, reliability, availability and serviceability, and system management. It may include I/O clusters, a memory controller, snoop filters, and a wide range of logic for handling transactions. While the example of FIG. 4, includes a microprocessor coupled to an IOH and an ICH (Input/Output Controller Hub), either the IOH or the ICH or both or any of the functions of these chips may be incorporated into any one or more of the microprocessors. The IOH and the ICH may also be combined, in whole or in part, inside of or outside of the microprocessor.

In the example of FIG. 4, the IOH 363 has a communications link 309 for each of three CPUs or processor cores 311, 313, 315. More or fewer than one IOH, three processor cores and communications links may be used. Alternatively, the communications links may be removed so that all of the CPUs communicate through one of the other CPUs or the IOH.

The IOH provides additional connectivity to other devices. There is an interface to system memory 367, such as DIMMs (Dual In-line Memory Modules) in which instructions and data may be stored, and a high speed interface, such as PCI (peripheral component interconnect) Express. The PCI Express interface may be used to couple to a variety of different high and low speed devices. In the example of FIG. 4, six PCI Express x4 lanes are shown. Two lanes connect to a TCP/IP (Transmission Control Protocol/Internet Protocol) Offload Engine 317 which may connect to network or TCP/IP devices such as a Gigabit Ethernet controllers 339. Two lanes connect to an I/O Processor node 319 which can support storage devices 321 using SCSI (Small Computer System Interface), RAID (Redundant Array of Independent Disks) or other interfaces. Two more lanes connect to a PCI translator hub 323 which may support interfaces to connect PCI-X 325 and PCI 327 devices. Two, four or more lanes of PCI Express couple to a graphics controller 341 to render images or video on a display 337. The PCI Express interface may support more or fewer devices than are shown here. In addition, the IOH may be adapted to support other protocols and interfaces instead of, or in addition to those described.

The IOH may also be coupled, using PCI Express or another bus to an ICH. The ICH 365 offers possible connectivity to a wide range of different devices. Well-established conventions and protocols may be used for these connections. Alternatively, these connections may be provided using the PCI interface 327 or another interface. The connections may include a SIO (Super Input/Output) port 375, a USB hub 371, and a local BIOS (Basic Input/Output System) flash memory 373. The SIO (Super Input/Output) port 375 may provide connectivity for a front panel 377 with buttons and a display, a keyboard 379, a mouse 381, and infrared devices 385, such as IR blasters or remote control sensors. The I/O port may also support floppy disk, parallel port, and serial port connections 383. Alternatively, any one or more of these devices may be supported from a USB, PCI or any other type of bus or interconnect. Wireless interfaces such as Bluetooth and WiFi may also be supported from any one or more of these busses.

The particular nature of any attached devices may be adapted to the intended use of the device. Any one or more of the devices, buses, or interconnects may be eliminated from this system and others may be added. For example, video may be provided on the PCI bus, on an AGP bus, through the PCI Express bus or through an integrated graphics portion of the host controller or a processing core.

A lesser or more equipped lock allocation system, header and metadata structure, pointer, base determination process, and computer environment than the examples described above may be preferred for certain implementations. Therefore, the configuration of the software transaction memory, locks, objects, memory allocation, conflict detection, and computer system will vary from implementation to implementation depending upon numerous factors, such as price constraints, performance requirements, technological improvements, or other circumstances. Embodiments of the invention may also be applied to other types of software-driven systems that use different hardware architectures than those shown in the Figures.

While embodiments of the invention have been described in the context of compilation and object-oriented programming, embodiments of the invention may also be applied to run-time operations and also to other types of programming languages. Embodiments of the invention may also be applied to a wide variety of different hardware with multiple threads, multiple cores, or multiple processors.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
   receiving a block of instructions for execution as an object in a software transactional memory transaction;
   computing a base of the object;
   finding a lock for the object using the base of the object.

2. The method of claim 1, wherein computing the base comprises using a header of the block.

3. The method of claim 1, wherein computing the base comprises finding a size of the instructions in the block that are for execution as objects.

4. The method of claim 1, wherein finding a lock comprises using the base to determine an index for the block and applying the index to a lookup table.

5. The method of claim 1, wherein finding a lock comprises finding a first word following a header for the object.

6. The method of claim 1, further comprising determining whether the block is within a reserved area size, and if not, then t sing an alternative conflict resolution scheme.

7. The method of claim 6, wherein using an alternative comprises using hashing-based conflict resolution.

8. The method of claim 6, wherein determining whether the block is within the reserved area size comprises subtracting a reserved base address from a pointer and comparing the result to the reserved area size.

9. The method of claim 1, wherein the lock is written into the base by a memory manager.

10. A machine-readable medium having instructions stored thereon that when executed by a computer cause the computer to:
   receive a pointer to a memory block for an allocated object in software transactional memory;
   determine a header address for the memory block using the pointer;
   access a header using the header address;
   determine a base for the memory block using information in the header; and
   use the base to find a lock for the object.

11. The medium of claim 10, wherein the base is an index to a table of locks.

12. The medium of claim 10, the instructions further causing the machine to find a size of the memory block for the object; and wherein determining a header address comprises determining a header address for the memory block from the pointer and the size.

13. The medium of claim 10, wherein the information in the header comprises an object size for the object and wherein determining a base comprises determining base for the memory block from the size.

14. The medium of claim 10, wherein determining a base comprises determining whether the lock is an on-side lock and determining the base if the object is an on-side lock.

15. The medium of claim 10, the instructions further causing the computer to determine whether the lock is an in-line lock and access reserved memory associated with the memory block to find a lock for the object.

16. The medium of claim 10, the instructions further causing the computer to determine whether the object is in small object space and if the object is not in small object space, then to use hashing-based conflict resolution.

17. The medium of claim 10, the instructions further causing the computer to use the lock for conflict resolution.

18. A computer system comprising:
   a software transactional memory to store instruction objects and locks for the objects, the objects including instructions for reads and writes to the memory; and
   a processor coupled to the memory, the processor including memory management to determine locks for the objects and store the locks in the memory, the processor receiving an object, computing the base of the object, and finding the lock for the object using the base of the object.

19. The system of claim 18, wherein computing the base comprises using a header of the block.

20. The system of claim 18, wherein computing the base comprises finding the size of the objects in the block.

\* \* \* \* \*

UNITED STATES PATENT AND TRADEMARK OFFICE
CERTIFICATE OF CORRECTION

| | | |
|---|---|---|
| PATENT NO. | : 7,502,897 B2 | Page 1 of 1 |
| APPLICATION NO. | : 11/477339 | |
| DATED | : March 10, 2009 | |
| INVENTOR(S) | : Hertzberg et al. | |

It is certified that error appears in the above-identified patent and that said Letters Patent is hereby corrected as shown below:

In column 7, at line 5, delete "t sing" and insert --using--.

Signed and Sealed this

Sixth Day of April, 2010

David J. Kappos
*Director of the United States Patent and Trademark Office*